(12) United States Patent
Green et al.

(10) Patent No.: US 10,792,897 B2
(45) Date of Patent: Oct. 6, 2020

(54) POLYMERIC MATERIALS

(71) Applicant: VICTREX MANUFACTURING LIMITED, Lancashire (GB)

(72) Inventors: Stuart Green, Lancashire (GB); Michael John Percy, Lancashire (GB)

(73) Assignee: VICTREX MANUFACTURING LIMITED, Lancashire (GB)

(*) Notice: Subject to any disclaimer, the term of this patent is extended or adjusted under 35 U.S.C. 154(b) by 0 days.

(21) Appl. No.: 15/321,979

(22) PCT Filed: Jun. 26, 2015

(86) PCT No.: PCT/GB2015/051865
§ 371 (c)(1),
(2) Date: Dec. 23, 2016

(87) PCT Pub. No.: WO2015/198063
PCT Pub. Date: Dec. 30, 2015

(65) Prior Publication Data
US 2017/0129225 A1     May 11, 2017

(30) Foreign Application Priority Data

Jun. 27, 2014 (GB) .................................. 1411511.7

(51) Int. Cl.
*B32B 27/32* (2006.01)
*B32B 27/08* (2006.01)
(Continued)

(52) U.S. Cl.
CPC ................ *B32B 27/08* (2013.01); *B32B 3/12* (2013.01); *B32B 5/02* (2013.01); *B32B 5/024* (2013.01);
(Continued)

(58) Field of Classification Search
CPC ....... B32B 27/285; B32B 27/288; B32B 3/12; C08J 2471/10; C09J 171/00;
(Continued)

(56) References Cited

U.S. PATENT DOCUMENTS 4,766,197 A    8/1988  Clendinning et al.
4,904,532 A *  2/1990  Staniland .................. C08J 5/04
                                                       428/408

(Continued)

FOREIGN PATENT DOCUMENTS

CN         101056757 A    10/2007
CN         102307919 A     1/2012
(Continued)

OTHER PUBLICATIONS

Cogswell, The microstructure of Aromatic Polymer Composites, 1992, Butterworth Heinemann, pp. 78-105 (Year: 1992).*
(Continued)

*Primary Examiner* — Prashant J Khatri
*Assistant Examiner* — Zachary M Davis
(74) *Attorney, Agent, or Firm* — Buchanan Ingersoll & Rooney PC

(57) ABSTRACT

A component comprising a first part and a second part, wherein a third part is positioned between the first and second parts, wherein:
(iv) said first part comprises a polymeric material (A) which comprises a repeat unit of formula (XI)

(Continued)

-continued

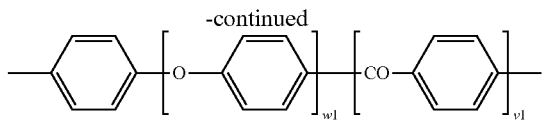

wherein t1, and w1 independently represent 0 or 1 and v1 represents 0, 1 or 2;

(v) said second part comprises a polymeric material (B) which comprises a repeat unit of formula (XI)

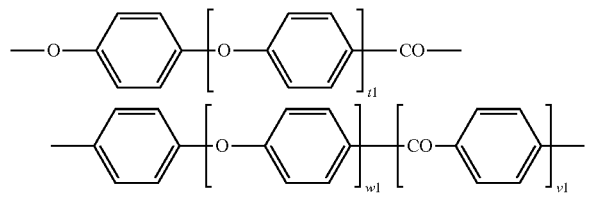

wherein t1, and w1 independently represent 0 or 1 and v1 represents 0, 1 or 2; and (vi) said third part comprises a polymeric material (C) which comprises a polymer having a repeat unit of formula —O-Ph-O-Ph-CO-Ph—   I and a repeat unit of formula —O-Ph-Ph-O-Ph-CO-Ph—   II wherein Ph represents a phenylene moiety.

18 Claims, 4 Drawing Sheets

(51) Int. Cl.
| | |
|---|---|
| B32B 27/28 | (2006.01) |
| C08G 65/40 | (2006.01) |
| B32B 5/26 | (2006.01) |
| B32B 7/12 | (2006.01) |
| B32B 27/12 | (2006.01) |
| B32B 27/20 | (2006.01) |
| B32B 3/12 | (2006.01) |
| C09J 171/00 | (2006.01) |
| C08L 71/00 | (2006.01) |
| B32B 5/02 | (2006.01) |
| B32B 5/22 | (2006.01) |
| C08J 5/12 | (2006.01) |
| C09J 5/06 | (2006.01) |

(52) U.S. Cl.
CPC .................. *B32B 5/22* (2013.01); *B32B 5/26* (2013.01); *B32B 7/12* (2013.01); *B32B 27/12* (2013.01); *B32B 27/20* (2013.01); *B32B 27/285* (2013.01); *B32B 27/288* (2013.01); *C08G 65/4012* (2013.01); *C08J 5/128* (2013.01); *C08L 71/00* (2013.01); *C09J 5/06* (2013.01); *C09J 171/00* (2013.01); *B32B 2260/021* (2013.01); *B32B 2260/046* (2013.01); *B32B 2262/0269* (2013.01); *B32B 2262/10* (2013.01); *B32B 2262/106* (2013.01); *B32B 2307/704* (2013.01); *B32B 2605/18* (2013.01); *C08G 2170/20* (2013.01); *C08G 2650/40* (2013.01); *C08J 2371/10* (2013.01); *C08J 2471/10* (2013.01); *C09J 2201/61* (2013.01); *C09J 2471/00* (2013.01); *C09J 2471/006* (2013.01)

(58) Field of Classification Search
CPC ................ C09J 171/006; C09J 2471/10; C09J 2471/006; C08G 65/00; C08G 65/38; C08G 65/40; C08G 65/4006; C08G 65/4012; C08G 65/4018; C08G 65/4025; C08G 65/4031; C08L 71/00; C08L 71/08; C08L 71/10; C08L 71/12; C08L 71/123
See application file for complete search history.

(56) References Cited

U.S. PATENT DOCUMENTS

| | | | |
|---|---|---|---|
| 2006/0090842 | A1 | 5/2006 | Chervin |
| 2011/0097575 | A1 | 4/2011 | Pratte et al. |
| 2012/0021168 | A1* | 1/2012 | Tanii ...................... B32B 27/32 428/116 |
| 2012/0028036 | A1 | 2/2012 | Bertelo et al. |
| 2013/0216799 | A1 | 8/2013 | Van Dijk et al. |
| 2017/0203551 | A1* | 7/2017 | Davis ...................... B32B 27/12 |

FOREIGN PATENT DOCUMENTS

| | | | |
|---|---|---|---|
| CN | 102548739 A | 7/2012 | |
| CN | 102337018 B | 1/2013 | |
| CN | 103038045 A | 4/2013 | |
| DE | 100 08 375 A1 | 9/2001 | |
| EP | 0056703 A1 * | 7/1982 | ............... B29B 9/14 |
| EP | 0 184 458 A2 | 6/1986 | |
| EP | 0 266 132 A | 5/1988 | |
| GB | 2518495 A | 3/2015 | |
| WO | 2015/019047 A1 | 2/2015 | |

OTHER PUBLICATIONS

Office Action dated Mar. 1, 2016, by the British Intellectual Property Office in corresponding British Application No. 1511247.7. (3 pages).

Notification of Transmittal of the International Search Report and the Written Opinion of the International Searching Authority (Forms PCT/ISA/220, PCT/ISA/210, and PCT/ISA/237) issued by the European Patent Office in corresponding International Application No. PCT/GB2015/051865. (11 pages).

\* cited by examiner

POLYMERIC MATERIALS

This invention relates to polymeric materials. Preferred embodiments relate to a component comprising first and second parts which are secured together by an adhesive. Suitably, the first and second parts comprise polyaryletherketones, especially polyetheretherketone (PEEK).

Within many industries, in particular the aerospace industry, it is desirable to secure and/or bond thermoplastic components together and a number of techniques have been proposed. For example, mechanical fastenings in the form of rivets have been proposed. Such rivets may be made from polyamide or from PEEK or polyamide imide as described in U.S. Pat. No. 5,361,483. However, the use of rivets may not be suitable in many cases such as on blind holes.

Many different welding processes, such as ultrasonic welding, induction welding and hot-plate welding, have been proposed for securing first and second thermoplastics parts together. However, local melting of the first and second parts in the region of the weld may affect the integrity and/or shape of the first and second parts. It may also lead to distortion due to residual stress build-up in the parts during the melting and/or cooling of the thermoplastic in the region of the weld.

In order to address some of the problems associated with welding processes, it has been proposed to provide a film and/or adhesive between the first and second parts to bond the first and second parts together.

JPH05177714A discloses the use of an epoxy-based adhesive or urethane resin to bond two PEEK plates together. Although the aforementioned resins may enable relatively strong bonds to be formed, disadvantageously the resins perform poorly at elevated temperatures and have poor chemical resistance properties.

Polyetherimide (PEI) film has also been proposed for joining first and second parts made from PEEK. However, PEI is amorphous (i.e. not crystalline) and, accordingly, has poor chemical resistance meaning it would not generally be suitable for structural applications in the aerospace industry.

US2012/160829 describes the use of an amorphous polyetherketoneketone (PEKK) film as a tie layer in assemblies such as composites and laminates. However, given the amorphous nature of the film, it also is not suitable for use in structural applications in the aerospace industry.

As a general point, the use of amorphous materials as described for bonding first and second parts together means that the joint between the parts is the weakest part of the structure, where properties such as solvent resistance are relatively low. Thus, the joint may be prone to attack by fluids such as aviation fluids leading to premature failure of the structure.

Polyaryletherketones have been proposed as hot-melt adhesives. U.S. Pat. No. 5,247,051 (Hoechst) described hot melt adhesives based on polyaryletherketones. More particularly, the document suggests that advantageous polyaryletherketone based hot melt adhesives have a ratio of the number of ether units to the number of ketone units which is less than 2:1 with the preferred ratio being 0.66 to 1.

It is an object of the invention to address the aforementioned problems.

It is an object of the present invention to address problems associated with securing first and second parts together.

According to a first aspect of the invention, there is provided a component comprising a first part and a second part, wherein a third part is positioned between the first and second parts, wherein:

(i) said first part comprises a polymeric material (A) which comprises a repeat unit of formula (XI)

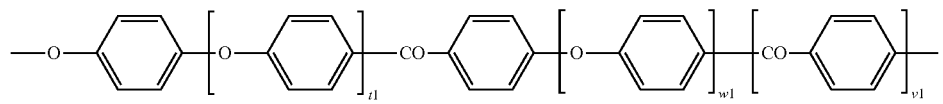

wherein t1, and w1 independently represent 0 or 1 and v1 represents 0, 1 or 2;

(ii) said second part comprises a polymeric material (B) which comprises a repeat unit of formula (XI)

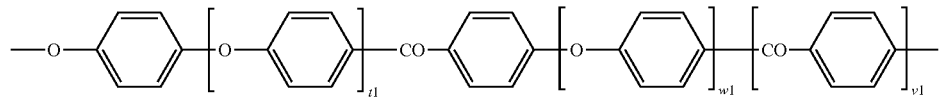

wherein t1, and w1 independently represent 0 or 1 and v1 represents 0, 1 or 2; and (iii) said third part comprises a polymeric material (C) which comprises a polymer having a repeat unit of formula —O-Ph-O-Ph-CO-Ph-        I and a repeat unit of formula —O-Ph-Ph-O-Ph-CO-Ph-        II wherein Ph represents a phenylene moiety.

Advantageously, said third polymeric material is crystalline and exhibits high chemical resistance, adheres very strongly to the polymeric materials (A) and (B) so a strong bond is formed between said first and second parts and manufacture of the component does not require the polymeric materials of the first and second parts to be melted (as in welding processes) thereby obviating distortion of, and introduction of stress into, the first and second parts.

Said polymeric materials (A) and (B) may independently comprise repeat units of formula XI. Thus, polymeric materials (A) and (B) may be the same or different.

Said polymeric material (A) is preferably semi-crystalline.

A skilled person can readily assess whether a polymer is semi-crystalline, for example, by wide angle X-ray diffraction (also referred to as Wide Angle X-ray Scattering or WAXS) or by Differential Scanning calorimetry (DSC).

More particularly, the level and extent of crystallinity in a polymer may be measured by wide angle X-ray diffraction, for example as described by Blundell and Osborn (Polymer 24, 953, 1983); or by DSC in a process which is also described in POLYMER Vol. 37, Number 20, 1996, page 4573.

DSC may be used to examine the crystallinity in a polymer, as described in Example 2.

The level of crystallinity in said polymeric material (A) may be at least 15%, suitably at least 20%, preferably at least 25% and, more preferably, at least 30%. In especially preferred embodiments, the crystallinity may be greater than 30%, more preferably greater than 35%. The level of crystallinity may be less than 60%.

The aforementioned methods provide the level of crystallinity in a bulk sample. As an alternative, FTIR may be used to assess crystallinity and this may be used to assess the level of crystallinity at a surface and/or across the thickness or surface of a sample. Reference is made to a paper titled "Crystallinity in Poly(Aryl-Ether-Ketone) Plaques Studied by Multiple Internal Reflection Spectroscopy" (Polymer Bull, 11, 433 (1984)). The crystallinity at the surface of polymeric material (A) may be at the same levels described above.

Said polymeric material (A) may have a repeat unit selected from a repeat unit XI wherein $t1=1$, $v1=0$ and $w1=0$; $t1=0$, $v1=0$ and $w1=0$; $t1=0$, $w1=1$, $v1=2$; or $t1=0$, $v1=1$ and $w1=0$. Polymeric material (A) more preferably has a repeat unit wherein $t1=1$, $v1=0$ and $w1-0$; or $t1=0$, $v1=0$ and $w1=0$. Polymeric material (A) more preferably has a repeat unit wherein $t1=1$, $v1=0$ and $w1=0$.

Polymeric material (A) suitably includes at least 50 mol %, (e.g. 50-100 mol %), preferably at least 60 mol % (e.g. 60-100 mol %), more preferably at least 80 mol % (e.g. 80 to 100 mol %), of repeat units of formula XI, especially such units where $t1=1$, $v1=0$ and $w1=0$.

Polymeric material (A) suitably includes at least 50 wt % (e.g. 50-100 wt %) of repeat units of formula XI.

Polymeric material (A) preferably consists essentially of a repeat unit of a formula XI, especially such a repeat unit wherein $t1=1$, $v1=0$ and $w1=0$.

In preferred embodiments, said polymeric material (A) is selected from polyetheretherketone, polyetherketone, polyetherketoneetherketoneketone and polyetherketoneketone. In a more preferred embodiment, said polymeric material (A) is selected from polyetherketone and polyetheretherketone. In an especially preferred embodiment, said polymeric material (A) is polyetheretherketone.

Said polymeric material (A) preferably has a melt viscosity (MV) of at least 0.06 $kNsm^{-2}$, preferably has a MV of at least 0.08 $kNsm^{-2}$, more preferably at least 0.085 $kNsm^{-2}$, especially at least 0.09 $kNsm^{-2}$. MV of said first polymer is suitably measured using capillary rheometry operating at 400° C. at a shear rate of 1000 $s^{-1}$ using a circular cross-section tungsten carbide die, 0.5 mm (capillary diameter)×3.175 mm (capillary length). Said first polymer may have a MV of less than 1.00 $kNsm^{-2}$, suitably less than 0.8 $kNsm^{-2}$.

Said polymeric material (A) may be part of a first composition which may include polymeric material (A) and a filler means. Said filler means may include a fibrous filler or a non-fibrous filler. Said filler means may include both a fibrous filler and a non-fibrous filler. A said fibrous filler may be continuous or discontinuous.

A said fibrous filler may be selected from inorganic fibrous materials, non-melting and high-melting organic fibrous materials, such as aramid fibres, and carbon fibre.

A said fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre.

A fibrous filler may comprise nanofibers.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, nanotubes and barium sulfate. The non-fibrous fillers may be introduced in the form of powder or flaky particles.

Said first composition may define a composite material which could be prepared as described in Impregnation Techniques for Thermoplastic Matrix Composites. A Miller and A G Gibson, Polymer & Polymer Composites 4(7), 459-481 (1996), EP102158 and EP102159, the contents of which are incorporated herein by reference. Preferably, in the method, said polymeric material (A) and said filler means are mixed at an elevated temperature, suitably at a temperature at or above the melting temperature of said polymeric material (A). Thus, suitably, said polymeric material (A) and filler means are mixed whilst the polymeric material (A) is molten. Said elevated temperature is suitably below the decomposition temperature of the polymeric material (A). Said elevated temperature is preferably at or above the main peak of the melting endotherm (Tm) for said polymeric material (A). Advantageously, the molten polymeric material (A) can readily wet the filler and/or penetrate consolidated fillers, such as fibrous mats or woven fabrics, so the composite material prepared comprises polymeric material (A) and filler means which is substantially uniformly dispersed throughout polymeric material (A).

The composite material may be prepared in a substantially continuous process. In this case polymeric material (A) and filler means may be constantly fed to a location wherein they are mixed and heated. An example of such a continuous process is extrusion. Another example (which may be particularly relevant wherein the filler means comprises a fibrous filler) involves causing a continuous filamentous mass to move through a melt or aqueous dispersion comprising polymeric material (A). The continuous filamentous mass may comprise a continuous length of fibrous filler or, more preferably, a plurality of continuous filaments which have been consolidated at least to some extent. The continuous fibrous mass may comprise a tow, roving, braid, woven fabric or unwoven fabric. The filaments which make up the fibrous mass may be arranged substantially uniformly or randomly within the mass. A composite material could be prepared as described in PCT/GB2003/001872, U.S. Pat. No. 6,372,294 or EP1215022.

Alternatively, the composite material may be prepared in a discontinuous process. In this case, a predetermined amount of polymeric material (A) and a predetermined amount of said filler means may be selected and contacted and a composite material prepared by causing polymeric material (A) to melt and polymeric material (A) and filler means to mix to form a substantially uniform composite material.

Preferably, said filler means comprises one or more fillers selected from glass fibre, carbon fibre, aramid fibres, carbon black and a fluorocarbon resin. More preferably, said filler means comprises glass fibre or carbon fibre.

A first composition or composite material as described may include 20 to 99.9 wt % (e.g. 20 to 70 wt %) of polymeric material (A) and 0.1 to 80 wt % (e.g. 30 to 80 wt %) of filler means. Preferred embodiments include greater than 10 wt %, more preferably greater than 40 wt % of filler means. A preferred first composition includes 40 to 60 wt % of filler means. An especially preferred first composition includes 40 to 60 wt % of carbon fibres.

Said first part may include at least 30 wt % or at least 45 wt % of said polymeric material (A). In some embodiments said first part may include at least 90 wt % of said polymeric material (A).

When said polymeric material (A) is part of a first composition, said first part may include at least 90 wt %, preferably at least 95 wt %, especially at least 99 wt % of said first composition.

In a preferred embodiment, said first part suitably includes at least 90 wt % (e.g. at least 99 wt %) of said polymeric material (A) or at least 95 wt % (e.g. at least 99 wt %) of said first composition.

Said polymeric material (B) may have a repeat unit selected from a repeat unit XI wherein t1=1, v1=0 and w1=0; t1=0, v1=0 and w1=0; t1=0, w1=1, v1=2; or t1=0, v1=1 and w1=0. Polymeric material (B) more preferably has a repeat unit wherein t1=1, v1=0 and w1-0; or t1=0, v1=0 and w1=0. Polymeric material (B) more preferably has a repeat unit wherein t1=1, v1=0 and w1=0.

Polymeric material (B) suitably includes at least 50 mol %, (e.g. 50-100 mol %), preferably at least 60 mol % (e.g. 60-100 mol %), more preferably at least 80 mol % (e.g. 80 to 100 mol %), of repeat units of formula XI, especially such units where t1=1, v1=0 and w1=0.

Polymeric material (B) suitably includes at least 50 wt % (e.g. 50-100 wt %) of repeat units of formula XI.

Polymeric material (B) preferably consists essentially of a repeat unit of a formula XI, especially such a repeat unit wherein t1=1, v1=0 and w1=0.

In preferred embodiments, said polymeric material (B) is selected from polyetheretherketone, polyetherketone, polyetherketoneetherketoneketone and polyetherketoneketone. In a more preferred embodiment, said polymeric material (B) is selected from polyetherketone and polyetheretherketone. In an especially preferred embodiment, said polymeric material (B) is polyetheretherketone.

Said polymeric material (B) preferably has a melt viscosity (MV) of at least 0.06 kNsm$^{-2}$, preferably has a MV of at least 0.08 kNsm$^{-2}$, more preferably at least 0.085 kNsm$^{-2}$, especially at least 0.09 kNsm$^{-2}$. MV is suitably measured using capillary rheometry as described above. Said first polymer may have a MV of less than 1.00 kNsm$^{-2}$, suitably less than 0.8 kNsm$^{-2}$.

Said polymeric material (B) may be part of a second composition which may include polymeric material (B) and a filler means. Said filler means may include a fibrous filler or a non-fibrous filler. Said filler means may include both a fibrous filler and a non-fibrous filler. A said fibrous filler may be continuous or discontinuous.

A said fibrous filler may be selected from inorganic fibrous materials, non-melting and high-melting organic fibrous materials, such as aramid fibres, and carbon fibre.

A said fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre.

A fibrous filler may comprise nanofibers.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, nanotubes and barium sulfate. The non-fibrous fillers may be introduced in the form of powder or flaky particles.

Said second composition may define a composite material which could be prepared as described for said first composition.

Preferably, said filler means comprises one or more fillers selected from glass fibre, carbon fibre, aramid fibres, carbon black and a fluorocarbon resin. More preferably, said filler means comprises glass fibre or carbon fibre.

A second composition or composite material as described may include 20 to 99.9 wt % (e.g. 20 to 70 wt %) of polymeric material (B) and 0.1 to 80 wt % (e.g. 30 to 80 wt %) of filler means. Preferred embodiments include greater than 10 wt %, more preferably greater than 40 wt % of filler means. A preferred second composition includes 40 to 60 wt % of filler means. An especially preferred second composition includes 40 to 60 wt % of carbon fibres.

Said second part may include at least 30 wt % or at least 45 wt % of said polymeric material (B). In some embodiments said first part may include at least 90 wt % of said polymeric material (B).

When said polymeric material (B) is part of a second composition, said second part may include at least 90 wt %, preferably at least 95 wt %, especially at least 99 wt % of said second composition.

In a preferred embodiment, said second part suitably includes at least 90 wt % (e.g. at least 99 wt %) of said polymeric material (B) or at least 95 wt % (e.g. at least 99 wt %) of said second composition.

Preferably, in said first part and said second part, said polymeric materials (A) and (B) are the same. In one embodiment, said first and second parts may have substantially the same composition and/or may be substantially identical, for example as described hereinafter in relation to the FIGS. 3 and 4 embodiment. In another embodiment, said first and second part may have different compositions. For example, one of the parts may include a higher wt % of filler compared to the other part. One of the parts may include less than 10 wt % filler or is preferably unfilled and the other part may include greater than 20 wt % or greater than 40 wt % of filler. An example of such an arrangement is described hereinafter in relation to the FIGS. 5 and 6 embodiment.

Said repeat units I and II are preferably in the relative molar proportions I:II of from 65:35 to 95:5.

Preferably, in said polymeric material (C), the following relationship applies:

$$\log_{10}(X\%) > 1.50 - 0.26\, MV;$$

wherein X % refers to the % crystallinity measured as described in Example 2 and MV refers to the melt viscosity measured using capillary rheometry operating at 340° C. at a shear rate of 1000 s$^{-1}$ using a circular cross-section tungsten carbide die, 0.5 mm (capillary diameter)×3.175 mm (capillary length). The MV measurement is taken 5 minutes after the polymer has fully melted, which is taken to be 5 minutes after the polymer is loaded into the barrel of the rheometer.

The phenylene moieties (Ph) in each repeat unit I and II may independently have 1,4-para linkages to atoms to which they are bonded or 1,3-meta linkages. Where a phenylene moiety includes 1,3-linkages, the moiety will be in the amorphous phase of the polymer. Crystalline phases will include phenylene moieties with 1,4-linkages. In many applications it is preferred for the polymeric material (C) to be highly crystalline and, accordingly, the polymeric material (C) preferably includes high levels of phenylene moieties with 1,4-linkages.

In a preferred embodiment, at least 95%, preferably at least 99%, of the number of phenylene moieties (Ph) in the repeat unit of formula I have 1,4-linkages to moieties to which they are bonded. It is especially preferred that each phenylene moiety in the repeat unit of formula I has 1,4-linkages to moieties to which it is bonded.

In a preferred embodiment, at least 95%, preferably at least 99%, of the number of phenylene moieties (Ph) in the repeat unit of formula II have 1,4-linkages to moieties to which they are bonded. It is especially preferred that each phenylene moiety in the repeat unit of formula II has 1,4-linkages to moieties to which it is bonded.

Preferably, the phenylene moieties in repeat unit of formula I are unsubstituted. Preferably, the phenylene moieties in repeat unit of formula II are unsubstituted.

Said repeat unit of formula I suitably has the structure

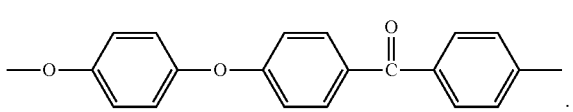

III

Said repeat unit of formula II suitably has the structure

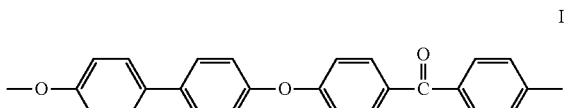

IV

Said polymeric material (C) may include at least 68 mol %, preferably at least 71 mol %, of repeat units of formula III. Particular advantageous polymers may include at least 72 mol %, or, especially, at least 74 mol % of repeat units of formula III. Said polymeric material (C) may include less than 90 mol %, suitably 82 mol % or less of repeat units of formula III. Said polymeric material (C) may include 68 to 82 mol %, preferably 70 to 80 mol %, more preferably 72 to 77 mol % of units of formula III.

Said polymeric material (C) may include at least 10 mol %, preferably at least 18 mol %, of repeat units of formula IV. Said polymeric material (C) may include less than 32 mol %, preferably less than 29 mol % of repeat units of formula IV. Particularly advantageous polymers may include 28 mol % or less; or 26 mol % or less of repeat units of formula IV. Said polymeric material (C) may include 18 to 32 mol %, preferably 20 to 30 mol %, more preferably 23 to 28 mol % of units of formula IV.

The sum of the mol % of units of formula III and IV in said polymeric material (C) is suitably at least 95 mol %, is preferably at least 98 mol %, is more preferably at least 99 mol % and, especially, is about 100 mol %.

The ratio defined as the mol % of units of formula III divided by the mol % of units of formula IV may be in the range 1.8 to 5.6, is suitably in the range 2.3 to 4 and is preferably in the range 2.6 to 3.3.

The Tm of said polymeric material (C) may be less than 330° C., is suitably less than 320° C., is preferably less than 310° C. In some embodiments, the Tm may be less than 306° C. The Tm may be greater than 280° C., or greater than 290° C., 295° C. or 300° C. The Tm is preferably in the range 300° C. to 310° C.

In a preferred embodiment, said polymeric material (C) has a Tg in the range 145° C.-155° C., a Tm in the range 300° C. to 310° C. and the difference between the Tm and Tg is in the range 145° C. to 165° C.

Said polymeric material (C) may have a crystallinity measured as described in Example 2 of at least 25%. The crystallinity measured by FTIR may also be at least 25%.

Said polymeric material (C) suitably has a melt viscosity (MV) of at least 0.10 kNsm$^{-2}$, preferably has a MV of at least 0.15 kNsm$^{-2}$, more preferably at least 0.20 kNsm$^{-2}$, especially at least 0.25 kNsm$^{-2}$.

Said third part may include at least 50 wt %, preferably at least 75 wt %, more preferably at least 90 wt %, especially at least 99 wt % of said polymeric material (C). Thus, preferably the third part is substantially unfilled.

The difference between the Tm of said polymeric material (A) and said polymeric materials (C) may be at least 20° C., preferably at least 30° C. The difference may be less than 50° C.

The difference between the Tm of said polymeric material (B) and said polymeric material (C) may be at least 20° C., preferably at least 30° C. The difference may be less than 50° C.

The difference between the Tm of said polymeric material (A) and said polymeric material (B) may be less than 10° C., preferably less than 5° C. Polymeric materials (A) and (B) preferably have the same repeat unit(s) and preferably are the same.

The area of the first part which is superimposed upon the second part may be at least 10 cm$^2$, at least 25 cm$^2$ or at least 100 cm$^2$.

A thickness of the first part measured perpendicular to the interface between the first and second parts may be at least 2 mm or at least 4 mm. The thickness may be less than 20 mm, less than 15 mm or less than 10 mm.

A thickness of the second part measured perpendicular to the interface between the first and second parts may be at least 2 mm or at least 4 mm. The thickness may be less than 20 mm, less than 15 mm or less than 10 mm.

In a first embodiment, said first part overlies said second part. Said first part may comprise an overmoulded region on said second part.

Said third part preferably has a thickness no greater than 100 μm. The thickness may be at least 5 μm. In some embodiments, there may be slight mixing of the third part into the surface of the first and second parts.

In one embodiment, said third part preferably defines a substantially continuous layer positioned between the first and second parts. Thus, a layer defined by said third part is preferably not interrupted. Said layer preferably has a substantially constant thickness across its extent. Preferably, said third part is positioned between all regions of the first part which are superimposed upon the second part. Thus, preferably, no area of the first part is superimposed upon an area of the second part without there being a continuous layer defined by said third part between the first and second parts. Thus, preferably, no area of said first part directly contacts an area of the second part.

In one embodiment, said component may include voids (which suitably allow the component to have a lower density compared to a component without such voids). Voids may be defined by virtue of the structure of the first part or the second part. For example, the first part or second part may be porous or have a honeycomb structure.

In one embodiment, said component may comprise said first part which defines a first layer; said third part which defines a second layer in contact with the first layer; and said second part which defines a third layer in contact with the second layer. Said component may include a fourth layer in contact with the third layer. The fourth layer may have any feature of the third part described. Thus, it preferably includes said polymeric material (C) as described. Said component may include a fifth layer in contact with the fourth layer. Said fifth layer may have any feature of the first part described. Thus, it preferably includes polymeric material (A).

Said component is preferably a part of an aircraft. Said component may have a maximum dimension of greater than 10 cm, greater than 50 cm or greater than 1 m.

According to a second aspect of the invention, there is provided a method of making a component (e.g. as described according to the first aspect), the method comprising: arranging a polymeric material (C) between a first member comprising a polymeric material (A) and a second member comprising a polymeric material (B), wherein said first member comprises a polymeric material (A) which comprises a repeat unit of formula (XI) as described in the first aspect; said second member comprises a polymeric material (B) which comprises a repeat unit of formula (XI) as described in the first aspect; and said polymeric material (C) is as described in the first aspect.

The method preferably comprises subjecting polymeric material (C) to a temperature which is less than the Tm of the polymeric material (A) in said first member and preferably less than the Tm of the polymeric material (B) in said second member. Said temperature is preferably greater than the Tm of said polymeric material (C). Said temperature may be less than 330° C., preferably less than 310° C. Said temperature may be greater than 280° C. Said temperature may be in the range 280° C. to 330° C., preferably in the range 290° C. to 315° C. The method preferably comprises subjecting a structure (e.g. a non-consolidated structure) comprising polymeric material (C), polymeric material (A) and polymeric material (B) to said temperature defined, for example within the range 290° C. to 315° C., suitably so as to melt polymeric material (C) but not to melt polymeric materials (A) and (B). Preferably, the method comprises application of pressure to a structure comprising polymeric materials (A), (B) and (C), suitably whilst the polymeric materials are being subjected to said temperature, thereby to consolidate the structure and produce said component.

Said polymeric material (C) may comprise a film which may have a thickness of less than 100 µm, for example in the range 5 to 100 µm. Said polymeric material (A) may be part of a structure which has a thickness of greater than the thickness of said film, for example greater than 5 mm or greater than 10 mm. Said polymeric material (B) may be part of a structure which has a thickness of greater than the thickness of said film, for example greater than 5 mm or greater than 10 mm.

Said polymeric material (A) may be part of a structure which includes a filler, for example a fibrous filler, such as 30 to 60 wt % filler. Said polymeric material (B) may be part of a structure which includes a filler, for example a fibrous filler, such as 30 to 60 wt % filler.

In the method, cooling of the polymeric material (C) after melting is preferably controlled so polymeric material (C) develops crystallinity (i.e. it is not amorphous). After cooling, it preferably has a crystallinity of at least 15%, preferably at least 20%, especially at least 23% measured as described herein.

According to another aspect of the invention, there is provided a component comprising a first part and a second part, wherein a third part is positioned between the first and second parts, wherein:

(i) said first part comprises a polymeric material (A) which comprises a repeat unit of formula (XI)

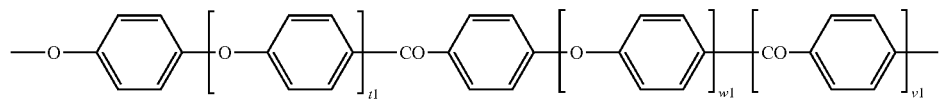

wherein t1, and w1 independently represent 0 or 1 and v1 represents 0, 1 or 2; or
said first part comprises a polymeric material (C) which comprises a polymer having a repeat unit of formula

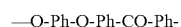  I and a repeat unit of formula

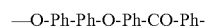  II wherein Ph represents a phenylene moiety;

(ii) said second part comprises a polymeric material (C) which comprises a polymer having a repeat unit of formula

  I and a repeat unit of formula

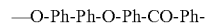  II wherein Ph represents a phenylene moiety; and (iii) said third part comprises a polymeric material (C) which comprises a polymer having a repeat unit of formula

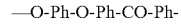  I and a repeat unit of formula

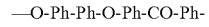  II wherein Ph represents a phenylene moiety.

The polymeric material (C) of the first part and the polymeric material (C) of the second part may be the same or different. The polymeric material (C) of the first part and the polymeric material (C) of the third part may be the same or different. The polymeric material (C) of the second part and the polymeric material (C) of the third part may be the same or different.

In one embodiment, said component may include voids (which suitably allow the component to have a lower density compared to a component without such voids). Voids may be defined by virtue of the structure of the first part or the second part. Preferably the first part and/or the second part includes voids. For example, the first part and/or second part may be porous or have a honeycomb structure. Preferably said second part has a honeycomb structure.

In one embodiment, preferably said first part and/or said second part is in direct contact with said third part.

In another embodiment, one or more further parts may be positioned between said first part and said third part. In another embodiment, one or more further parts may be positioned between said second part and said third part.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

Specific embodiments of the invention will now be described, by way of example, with reference to the accompanying drawings, in which:

FIG. 1 which is a schematic representation of two parts prior to being bonded together using a first method;

Figure 1:
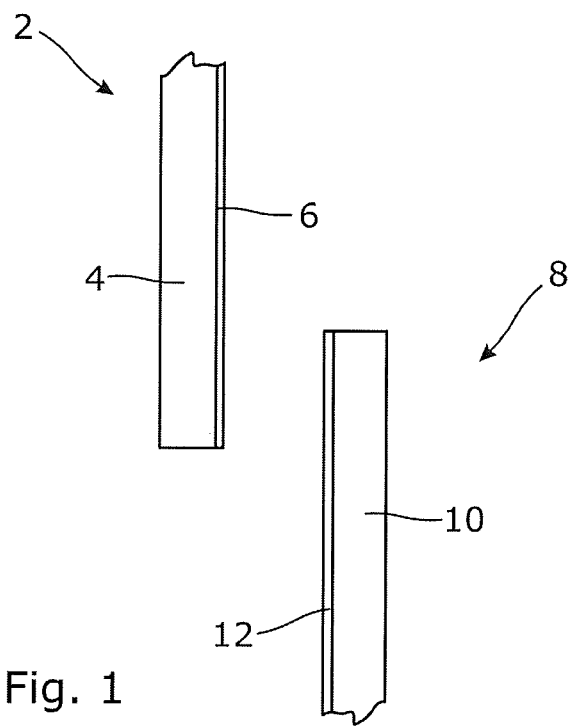

The following materials are referred to hereinafter:

Polymer composition A—PEEK 90G—polyetheretherketone (PEEK) having a melt viscosity (MV) of 0.09 KNsm$^{-2}$ (measured as described herein) obtained from Victrex Manufacturing Ltd.

Polymer composition B—PEEK-PEDEK—a copolymer made as described in Example 1 having an MV of 0.15 KNsm$^{-2}$ (measured as described herein), a Tg of 149° C., a Tm of 302° C. and a crystallinity of 29%, measured as described in Example 2.

Polymer composition C—refers to PEEK having a melt viscosity of 0.09 KNsm$^{-2}$ with 40 wt % high modulus short carbon fibres, sold as Victrex 90HMF40 by Victrex Manufacturing Ltd.

Polymer composition D—refers to PEEK having a melt viscosity of 0.09 KNsm$^{-2}$ with 30 wt % glass fibres, sold as Victrex 90GL30 by Victrex Manufacturing Ltd.

Polymer composition E—refers to PEEK having a melt viscosity of 0.09 KNsm$^{-2}$ with 30 wt % aramid fibre.

Polymer composition F—refers to PEEK having a melt viscosity of 0.09 KNsm$^{-2}$ with 30 wt % ceramic.

Ceramic—refers to Deranox™ 970 Alumina obtained from Morgan Technical Ceramics.

Aramid fibre—refers to DuPont Kevlar 49 woven fabric.

Epoxy—refers to Araldite (Trade Mark) AV138M/HV998.

Skydrol PE-5—hydraulic aviation fluid obtained from Eastman Chemical Company.

The copolymer used in polymer composition B was made as follows:

EXAMPLE 1—PREPARATION OF POLYETHERETHERKETONE (PEEK)-POLYETHERDIPHENYLETHERKETONE (PEDEK) COPOLYMER

A 300 litre vessel fitted with a lid, stirrer/stirrer guide, nitrogen inlet and outlet was charged with diphenylsulphone (125.52 kg) and heated to 150° C. Once fully melted 4,4'-diflurobenzophenone (44.82 kg, 205.4 mol), 1,4-dihydroxybenzene (16.518 kg, 150 mol) and 4,4'-dihydroxydiphenyl (9.311 kg, 50 mol) were charged to the vessel. The contents were then heated to 160° C. While maintaining a nitrogen blanket, dried sodium carbonate (21.368 kg, 201.6 mol) and potassium carbonate (1.106 kg, 8 mol), both sieved through a screen with a mesh of 500 micrometres, were added. The D50 of the sodium carbonate was 98.7 μm. The temperature was raised to 180° C. at 1° C./min and held for 100 minutes. The temperature was raised to 200° C. at 1° C./min and held for 20 minutes. The temperature was raised to 305° C. at 1° C./min and held until desired melt viscosity was reached, as determined by the torque rise of the stirrer. The required torque rise was determined from a calibration graph of torque rise versus MV. The reaction mixture was poured via a band caster into a water bath, allowed to cool, milled and washed with acetone and water. The resulting polymer powder was dried in a tumble dryer until the contents temperature measured 112° C. The copolymer had a crystallinity of 29%, measured as described in Example 2.

EXAMPLE 2—DIFFERENTIAL SCANNING CALORIMETRY TO ASSESS CRYSTALLINITY

Crystallinity referred to herein may be assessed by several methods for example by density, by it spectroscopy, by X-ray diffraction or by differential scanning calorimetry (DSC). The DSC method has been used to evaluate the crystallinity of polymers described herein using a Mettler Toledo DSC1 Star system with FRS5 sensor.

The Glass Transition Temperature (Tg), the Melting Temperature (Tm) and Heat of Fusions of Melting (ΔHm) for the polymers described herein may be determined using the following DSC method.

A 8 mg sample of the polymer was heated from 30° C. to 400° C. at 20° C./min, held for 5 minutes, then cooled at 20° C./minute to 30° C. and held for 5 minutes at this temperature. The heat/cool cycle was repeated. From the DSC trace obtained from the second heat/cool cycle, the onset Tg was obtained as the intersection of the lines drawn along the pre-transition baseline and a line drawn along the greatest slope obtained during the transition. The Tm was the temperature at which the main peak of the melting endotherm reached a maximum.

The Heat of Fusion for melting (ΔHm) was obtained by connecting the two points at which the melting endotherm deviates from the relatively straight baseline. The integrated area under the endotherm as a function of time yields the enthalpy (mJ) of the melting transition: the mass normalised heat of fusion is calculated by dividing the enthalpy by the mass of the specimen (J/g). The level of crystallisation (%) is determined by dividing the Heat of Fusion of the specimen by the Heat of Fusion of a totally crystalline polymer, which for polyetheretherketone is 130 J/g.

Using DSC as described, the copolymer of Example 1 had the following characteristics: Tg=149° C., Tm=302° C.

EXAMPLE 3—GENERAL PROCEDURE FOR TESTING OF SAMPLES

Parts were machined into 25 mm wide strips, giving a 25 mm×25 mm overlap bonded area. Single lap-joint shear tests were carried out on an Instron tensile testing machine operating with a 50KN load cell and a cross-head speed of 13 mm/min in accordance with ASTM-5858. Measurements were carried out at 23° C. and 120° C. The maximum load was recorded giving an indication of the bond strength.

EXAMPLE 4—GENERAL PROCEDURE FOR MAKING PARTS (FIRST METHOD)

Polymer composition C was provided as a part in the form of a pre-preg plate which was made by coating a carbon fibre mat with finely powdered PEEK having melt viscosity as described. The PEEK is subsequently melted so it penetrates throughout the mat. The mat was cut to define a 160 mm×250 mm plate.

A pre-preg plate comprising Polymer composition E was prepared as for composition C except using an aramid fibre mat.

EXAMPLE 5—GENERAL PROCEDURE FOR MAKING PARTS (SECOND METHOD)

Parts made from Polymer composition A were obtained from injection moulded plaques which were made using an Engel 740/220 injection moulding machine with a tool temperature of 145-155° C., barrel temperature of 350° C.-360° C., nozzle temperature 365° C., holding pressure of 30 bar, injection pressure of 140 bar and screw speed of 45 rpm. The plaques were then machined to the required size (160 mm×250 mm). Parts made from Polymer compositions D and F were obtained in the same way except that the tool temperature was increased to 180-200° C., the barrel temperature was increased to 370-380° C. and the nozzle temperature was increased to 380° C.

A summary of the parts made is provided in Table 1.

TABLE 1

| Part Reference | Polymer Composition | Summary |
| --- | --- | --- |
| P1 | A | Made as described in Example 5 |
| P2 | D | Made as described in Example 5 |
| P3 | C | Made as described in Example 4 |
| P4 | E | Made as described in Example 4 |
| P5 | F | Made as described in Example 5 |

EXAMPLE 6—GENERAL PROCEDURE FOR BONDING COMPONENTS TO ONE ANOTHER USING POLYMER COMPOSITION B (FIRST METHOD)

A 15 µm thick piece of film made from a selected polymer composition was co-consolidated with a first part in an injection moulding compression tool to define a first assembly 2 comprising the first part 4 and film 6, as represented in FIG. 1. Co-consolidation involves placing the film (160 mm×250 mm) in a compression moulding tool which had previously been treated with release agent. Then an injection moulded plaque (160 mm×250 mm) made as described in Example 5 was placed on top of the film in the tool, the tool was heated to 320° C. and held at this temperature and a pressure of 50 bar for 10 minutes before being cooled to 60° C., whereupon the consolidated part was removed. A second assembly 8 comprising a second part 10 and a film 12 is produced in a similar manner.

The bonding surfaces of the assemblies 2, 8 to be joined were cleaned by wiping with acetone to remove grease and dirt and allowed to dry. The assemblies were bonded together in a single overlap shear geometry. This involved the assemblies being brought together in a press with a 25 mm overlap. Spacers were used to keep the composite plates parallel to each other whilst pressure was applied. The platens of the press were heated up from 60° C. to 320° C. over 30 minutes, held at 320° C. for 20 minutes and then cooled down to 60° C. over 40 minutes whilst under a pressure of 50 Ncm$^{-2}$ which was held over the 90 minute duration.

EXAMPLE 7—GENERAL PROCEDURE FOR BONDING COMPONENTS TOGETHER USING POLYMER COMPOSITION B (SECOND METHOD)

Figure 2:
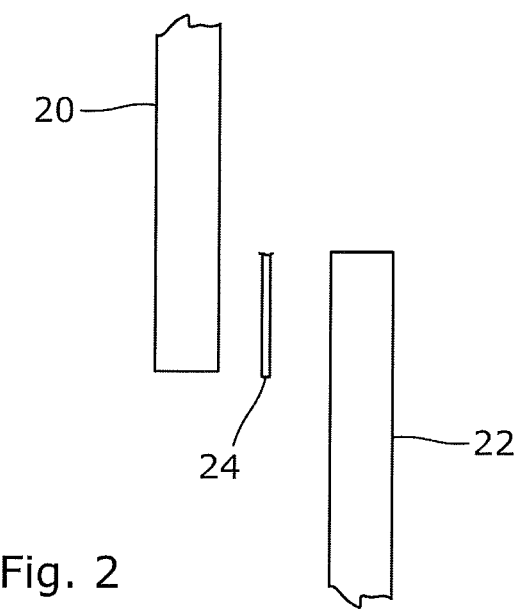
FIG. 2 is a schematic representation of two parts being bonded together using a second method.

As an alternative to the method of Example 6, the two step process (i.e. produce co-consolidated first and second parts; and then bond the first and second parts) was replaced with a one step process represented in FIG. 2 wherein first and second parts 20, 22 are bonded together by a single piece of film 24. In this case, as shown in FIG. 2, composite plates defining parts 20, 22 were placed in a press with a 25 mm overlap and with a 25 µm film 24 in-between.

Spacers were used as described in Example 6 and the plates of the press were heated up from 60° C. to 320° C. over 30 minutes, held at 320° C. for 20 minutes and then cooled down to 60° C. over 40 minutes whilst under a pressure of 50 Ncm$^{-2}$ which was held over 90 minutes duration.

EXAMPLE 8—GENERAL PROCEDURE FOR BONDING COMPONENTS TOGETHER USING COMPOSITION B (THIRD METHOD)

As an alternative to Examples 6 and 7, one part (e.g. part 2 of FIG. 1) may be bonded to a part (e.g. part 20 of FIG. 2) using a film 24 in a press, generally using the conditions described in Examples 6 and 7.

EXAMPLE 9—GENERAL PROCEDURE FOR BONDING COMPONENTS TOGETHER USING POLYMER COMPOSITION B (FOURTH METHOD)

In a further alternative, one part (e.g. part 2 of FIG. 1]) may be bonded to a part (e.g. part 20 of FIG. 2) via film 6 which is a component of part 2; that is, only a single layer of film may be used.

EXAMPLE 10 (COMPARATIVE)—GENERAL PROCEDURE FOR BONDING COMPONENTS TOGETHER USING POLYMER COMPOSITION A

The procedure described in Examples 6 and 7 was generally followed except that films 6, 12, 24 comprised Polymer Composition A. Polymer composition A melts at a higher temperature than Polymer Composition B. Accordingly, the process differs from that described in Example 4, 6 and 7 in that the assemblies are heated at 340° C. after being brought together, to thereby bond the assemblies together.

EXAMPLE 11 (COMPARATIVE)—GENERAL PROCEDURE FOR BONDING COMPOSITIONS TOGETHER USING EPOXY

First and second parts to be bonded together are cleaned as described in Example 6 and then the two component Epoxy adhesive is applied directly to the parts and a 15 minute 100° C. curing cycle was used to bond the parts together.

Results

The strength of the bonds between parts of the assemblies made as described in Examples 4 to 6 was assessed using the test described in Example 3 and the results are provided in Table 2.

(ii) The use of Polymer Composition B results in a stronger bond between bonded parts compared to the use of epoxy resin for which cohesive failure at low loads was observed at 23° C. At higher temperatures (120° C.), the fall-off in bond strength is very significant meaning that epoxy use in challenging (e.g. aerospace) applications is impractical.

The chemical resistance of parts tested was assessed as described in Example 12.

EXAMPLE 12—CHEMICAL RESISTANCE OF PARTS

Parts made from pre-preg plates of composition C bonded with either epoxy or composition B were immersed in hydraulic aviation fluid (Skydrol PE-5) at room temperature for a period of 24 hours. The strips were then dried under vacuum at 70° C. for 24 hours. Visual inspection of the bond of the epoxy bonded part indicated some dissolution of the bonding material at the periphery of the bond, whereas the sample bonded with composition B appeared to be unaffected. Lap shear tests carried out on the parts gave a value of 19.2 $Nmm^{-2}$ for the part bonded with composition B, which was found to be comparable to a part not immersed in aviation fluid. No comparative value could be obtained from the epoxy bonded part owing to the deterioration of the bond. This illustrates the superior chemical resistance of composition B over the epoxy material.

A layer of Polymer composition B may be used as an adhesive to secure two parts which comprise PEEK (or another polyaryletherketone) together. For example, Composition B may be used to secure parts together in aircraft manufacture. For example, the following aircraft parts may be secured: internal fuselage panels, internal flooring panels, ribs and beams within aircraft wings and wing structures and aircraft control structures such as ailerons, flaps and rudders.

Figure 3:
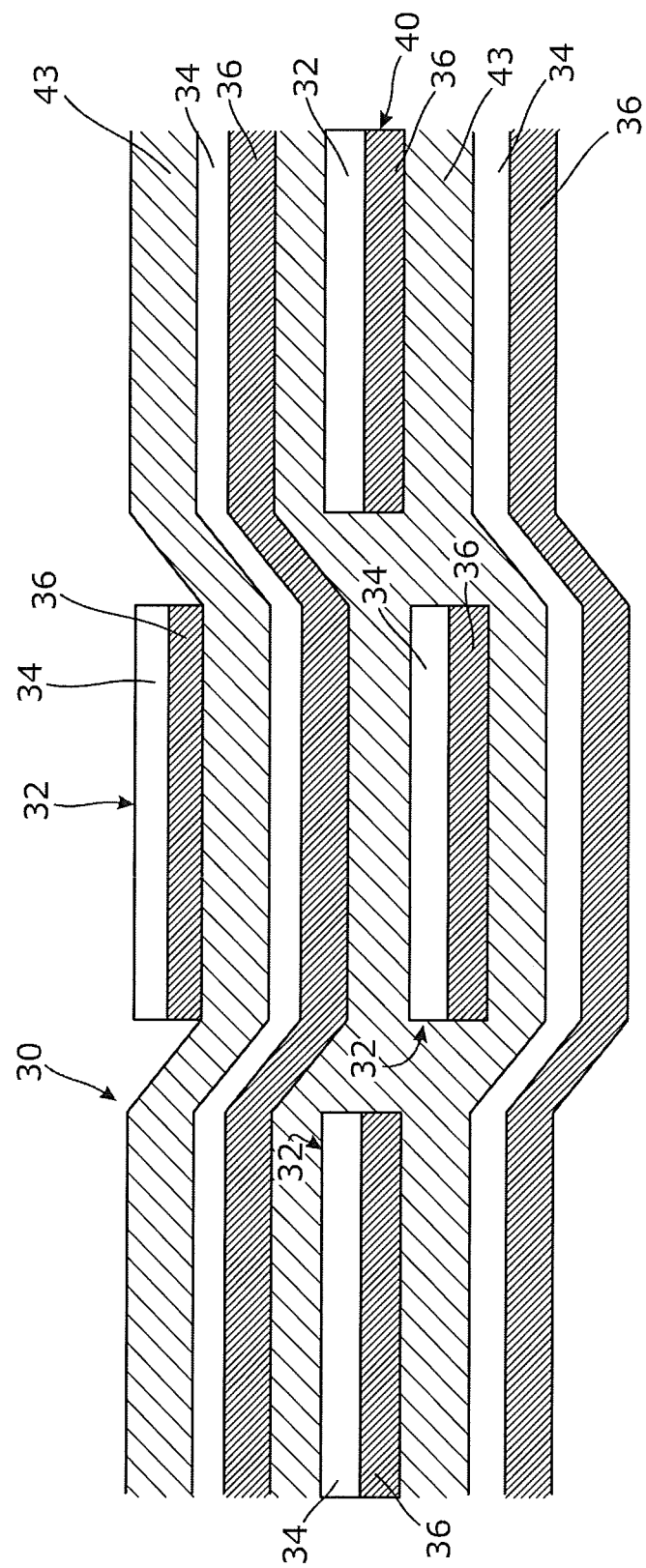
FIG. 3 is a schematic cross-section of co-extruded tapes woven together.
Figure 4:
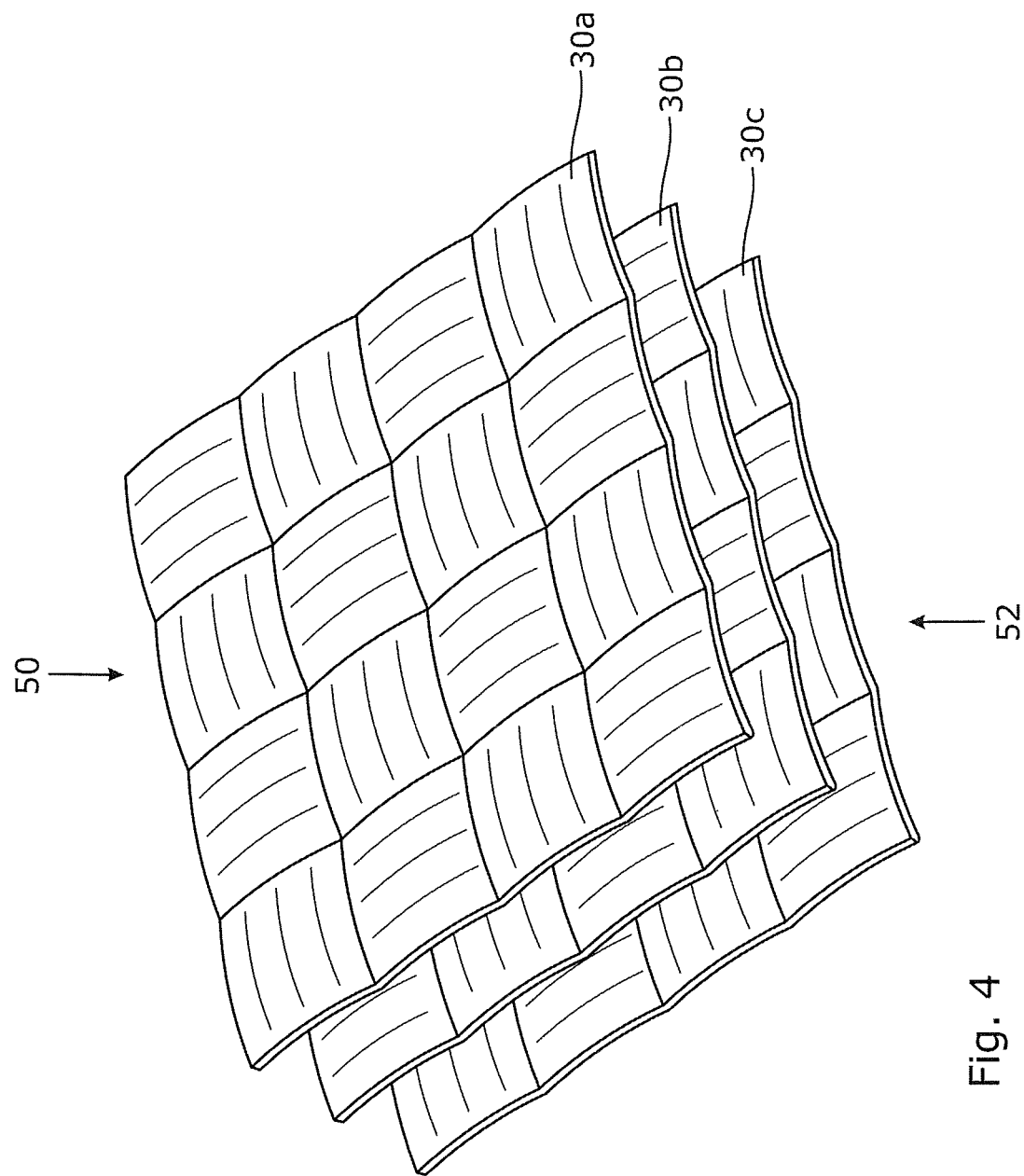
FIG. 4 is a schematic representation of three layers of the woven tapes of FIG. 3 being combined to form a structure.

In one embodiment, Polymer composition B may be used as an adhesive as illustrated in FIGS. 3 and 4. A woven layer

TABLE 2

| PARTS BONDED TOGETHER | | METHOD USED TO BOND PARTS | MAXIMUM LOAD (Nmm−2) Adhesive used to bond parts | | | | | |
|---|---|---|---|---|---|---|---|---|
| | | | Film(s) of Polymer Composition B | | Film(s) of Polymer Composition A | | Epoxy as described in Example 11 | |
| Part 1 reference | Part 2 reference | | 23° C. | 120° C. | 23° C. | 120° C. | 23° C. | 120° C. |
| P1 | P2 | Example 6 | 20.0 | 17.7 | 19.8 | 17.3 | 5.1* | 2.9# |
| P1 | P3 | Example 6 | 21.2 | 19.0 | 20.0 | 17.6 | 5.5* | 3.4# |
| P3 | P3 | Example 7 | 19.5 | 17.5 | 19.3 | 17.0 | 5.5* | 3.1# |
| P3 | P4 | Example 6 | 19.2 | 17.8 | 19.3 | 17.6 | 5.0* | 3.0# |
| P3 | P5 | Example 6 | 20.0 | 18.2 | 19.8 | 18.0 | 4.8* | 2.5# |

The following notes apply to Table 2:
*exhibits adhesive failure at adhesive/substrate interface
exhibits cohesive failure of the adhesive leaving adhesive on both sides of the substrate.

Referring to Table 2, the following should be noted:
(i) The use of Polymer Composition B (PEEK-PEDEK) results in a stronger bond between bonded parts compared to use of Polymer Composition A (PEEK). In addition, since Polymer Composition B needs only to be heated to, for example 305° C., the PEEK included in parts P1 to P5 will not be melted in the bonding process thereby obviating distortion of and introduction of stress into parts P1 to P5 during the process.

30 comprises elongate warp tapes 32 (typically of 10-100 µm), each comprising a layer 34 comprising PEEK and a juxtaposed layer 36 comprising Polymer composition B. The layer 30 also includes weft tapes 40 (typically of 10-100 µm), which are the same as the warp tapes. The warp and weft tapes are woven into carbon fabric 43.

A structure illustrated in FIG. 4 comprises three woven layers 30a, 30b and 30c (each being as described with reference to FIG. 3) which are assembled in a stack and then subjected to heat (to melt the Polymer composition B in the layers 30*a*, 30*b* and 30*c* but not to melt the PEEK within the layers) and pressure (in the direction of arrows 50, 52) to urge the layers together. Polymer composition B acts as an adhesive to secure the PEEK layers together, since in the consolidated structure, polymer Composition B penetrates the carbon fabric.

Each tape 32, 40 may be made by co-extrusion followed by stretching to orient it and increase the tensile strength of the PEEK layer to above 500 MPa (when measured in accordance with ASTMD3759). The stretched tapes may then be woven as described. Alternatively, lengths of oriented PEEK tape and non-oriented tape comprising Polymer B composition may be selected and superimposed to define a pair of tapes which is co-weaved with another identical pair of tapes to define the structure in FIG. 3.

Figure 5:
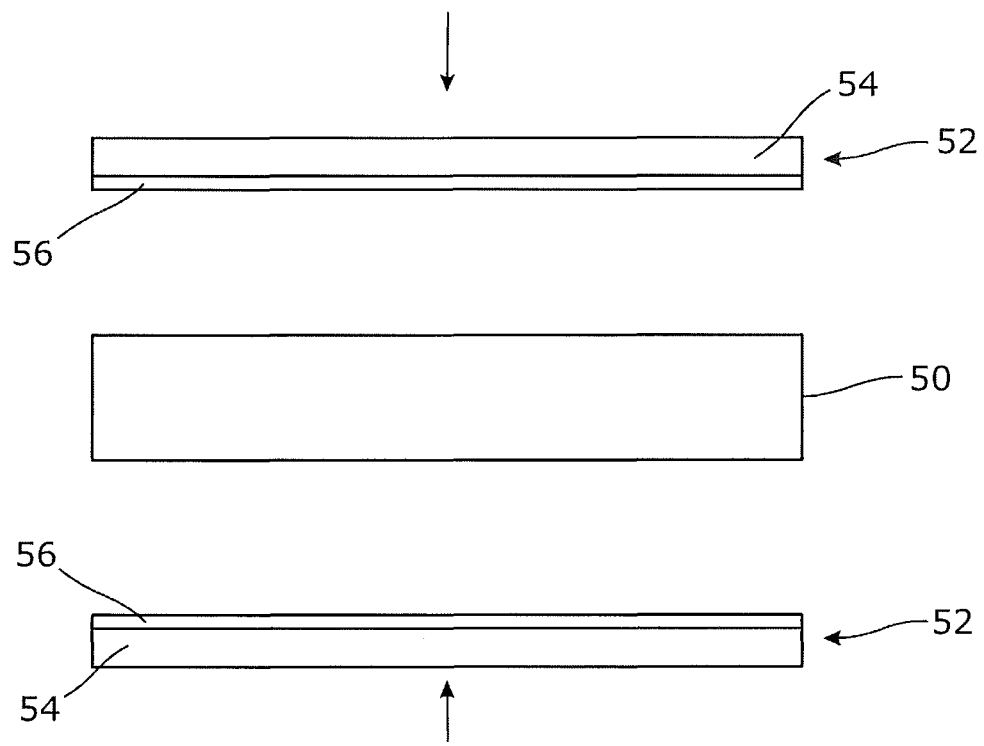
FIG. 5 is a schematic representation of a laminar structure including a honeycomb layer, prior to assembly.
Figure 6:
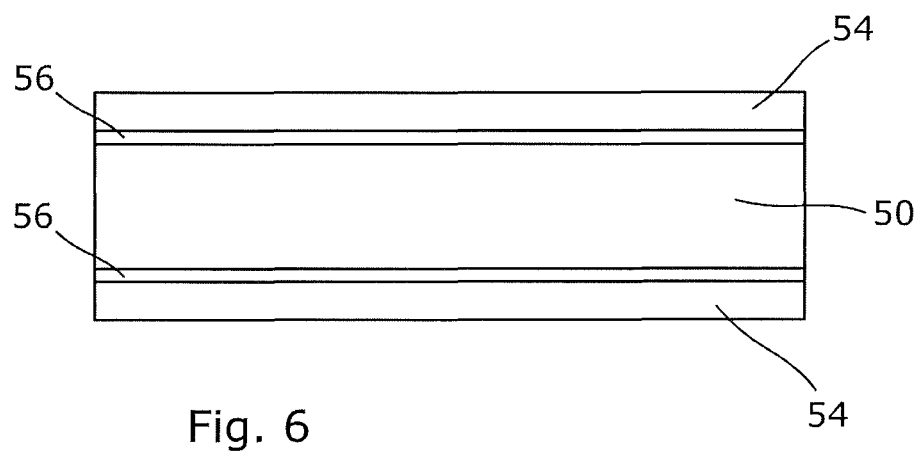
FIG. 6 is a schematic representation of the laminar structure of FIG. 5 after assembly.

In a second embodiment, Polymer composition B may be used as an adhesive in the manufacture of honeycomb based structures. FIG. 5 shows a light-weight honeycomb core 50 made from PEEK. In an alternative embodiment the light-weight honeycomb core 50 may be made from the Polymer composition B. On opposite sides of the core 50 are shown composite structures 52 each of which comprises a composite skin 54 made from PEEK and carbon fibre and a film layer 56 made from Polymer composition B. The components shown in FIG. 5 may be pressed together and heated through the skins 54 to melt the film layers 56 so that the core 50 fuses to the composite structures 52, to define a structure as shown in FIG. 6.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A component comprising a first part and a second part, wherein a third part having a different composition than the first and second parts is positioned between the first and second parts, wherein:

(i) said first part comprises a polymeric material (A) selected from the group consisting of PEEK, PEK, PEKEKK, and PEKK;

(ii) said second part comprises a polymeric material (B) selected from the group consisting of PEEK, PEK, PEKEKK, and PEKK; and (iii) said third part comprises a polymeric material (C) which comprises a polymer having a repeat unit of formula

—O-Ph-O-Ph-CO-Ph-    I and a repeat unit of formula

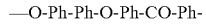

—O-Ph-Ph-O-Ph-CO-Ph-    II wherein Ph represents a phenylene moiety.

2. The component according to claim 1, wherein the level of crystallinity in said polymeric material (A) is at least 15%, and the level of crystallinity in said polymeric material (B) is at least 15%; and/or wherein in said polymeric material (C), the following relationship applied:

log 10($X$%)>1.50−0.26 MV;

wherein X % refers to the % crystallinity measured as described in Example 2 and MV refers to the melt viscosity; and/or wherein said polymeric material (C) has a crystallinity of at least 25%.

3. The component according to claim 1, wherein said polymeric material (A) has a melt viscosity (MV) of at least 0.06 kNsm$^{-2}$ wherein MV is measured using capillary rheometry operating at 400° C. at a shear rate of 1000 s$^{-1}$ using a circular cross-section tungsten carbide die, 0.5 mm (capillary diameter)×3.175 mm (capillary length) and/or said polymeric material (B) has a MV of at least 0.06 kNsm$^{-2}$.

4. The component according to claim 1, wherein said polymeric material (A) is part of a first composition which includes polymeric material (A) and a filler means; and/or wherein said first composition includes 20 to 99.9 wt % of polymeric material (A) and 0.1 to 80 wt % of filler means; and/or wherein said first composition includes 40 to 60 wt % of carbon fibres and 40 to 60 wt % of polymeric material (A).

5. The component according to claim 1, wherein said polymeric material (B) is part of a second composition which includes polymeric material (B) and a filler means; and/or wherein said second composition includes 20 to 99.9 wt % of polymeric material (B) and 0.1 to 80 wt % of filler means; and/or wherein said second composition includes 40 to 60 wt % of carbon fibres and 40 to 60 wt % of polymeric material (B).

6. The component according to claim 1, wherein, in said first part and said second part, said polymeric materials (A) and (B) are the same and/or wherein said first and second parts have substantially the same composition.

7. The component according to claim 1, wherein said repeat units I and II are in the relative molar proportions 1:11 of from 65:35 to 95:5.

8. The component according to claim 1, wherein the Tm of said polymeric material (C) is less than 330° C. and is greater than 280° C.; and/or wherein the difference between the melting temperature Tm of said polymeric material (A) and said polymeric material (C) is at least 20° C.

9. The component according to claim 1, wherein said third part include at least 50 wt % of said polymeric material (C).

10. The component according to claim 1, wherein the area of the first part which is superimposed upon the second part is at least 10 cm$^2$, or a thickness of the first part measured perpendicular to the interface between the first and second parts is at least 2 mm.

11. The component according to claim 1, wherein said third part has a thickness no greater than 100 μm.

12. The component according to claim 1, wherein said third part defines a substantially continuous layer positioned between the first and second parts.

13. The component according to claim 1, wherein said component comprises said first part which defines a first layer; said third part which defines a second layer in contact with the first layer; said second part which defines a third layer in contact with the second layer; a fourth layer in contact with the third layer which includes said polymeric material (C); and a fifth layer in contact with the fourth layer which includes polymeric material (A).

14. The component according to claim 1, wherein the first and third parts are formed as co-extruded tape.

15. The component according to claim 1, wherein the second part includes voids and has a honeycomb structure.

16. A method of making a component, the method comprising: arranging a polymeric material (C) between a first member comprising a polymeric material (A) and a second member comprising a polymeric material (B), wherein said first member comprises a polymeric material (A) as described in claim 1; said second member comprises a polymeric material (B) as described in claim 1; and said polymeric material (C) is as described in claim 1.

17. The method according to claim 16, wherein the method comprises subjecting polymeric material (C) to a temperature which is less than the melting temperature, Tm, of the polymeric material (A) in said first member and less than the Tm of the polymeric material (B) in said second member but is greater than the Tm of said polymeric material (C); and/or, wherein said temperature is less than 330° C.; and is greater than 280° C.

18. The method according to claim 16, wherein said polymeric material (C) is in the form of a film; and/or, in the method, cooling of the polymeric material (C) after melting is controlled so polymeric material (C) develops crystallinity.

* * * * *